US 6,400,494 B1

(12) United States Patent
Kondo et al.

(10) Patent No.: US 6,400,494 B1
(45) Date of Patent: Jun. 4, 2002

(54) TRAVELING WAVE OPTICAL MODULATOR

(75) Inventors: Jungo Kondo, Aichi Pref.; Atsuo Kondo, Okazaki; Kenji Aoki, Ogaki, all of (JP)

(73) Assignee: NGK Insulators, Ltd., Nagoya (JP)

( * ) Notice: Subject to any disclaimer, the term of this patent is extended or adjusted under 35 U.S.C. 154(b) by 65 days.

(21) Appl. No.: 09/636,568

(22) Filed: Aug. 10, 2000

(30) Foreign Application Priority Data

Aug. 27, 1999 (JP) ............................................ 11-241481

(51) Int. Cl.⁷ .............................. G02F 1/00; G02F 1/035
(52) U.S. Cl. ...................... 359/322; 359/245; 359/237; 385/3
(58) Field of Search ................................. 359/237, 245, 359/249, 315, 320, 322; 385/2, 3, 5

(56) References Cited

U.S. PATENT DOCUMENTS

| 5,056,897 A | * | 10/1991 | Akiyama et al. | ............... 359/72 |
| 5,138,480 A | | 8/1992 | Dolfi et al. | .................. 359/251 |
| 6,111,682 A | | 8/2000 | Minakata et al. | ........... 359/245 |
| 6,172,791 B1 | * | 1/2001 | Gill et al. | ..................... 359/249 |
| 6,219,469 B1 | | 4/2001 | Minakata et al. | ............... 385/2 |
| 2001/0007601 A1 | * | 7/2001 | Kondo et al. | .................. 385/2 |

FOREIGN PATENT DOCUMENTS

| EP | 0 828 175 A2 | 3/1998 |
| JP | 1-219819 | 9/1989 |
| JP | 2-93423 | 4/1990 |
| JP | 5-196902 | 8/1993 |
| JP | 5-241115 | 9/1993 |
| JP | 10-133159 | 5/1998 |
| JP | 10-133159 A | 5/1998 |
| JP | 11-101962 | 4/1999 |

OTHER PUBLICATIONS

"40–Gbit/s Ti:LiNbO₃ Optical Modulator with a Two–Stage Electrode", *IEICE Transactions on Electronics*, vol. E81–C, No. 8, Aug. 1998 (pp. 1316–1320), Noguchi et al.

"Broadband and low driving–voltage LiNbO₃ optical modulators", *IEE PRoceedings: Optoelectronics, Institute of Electrical Engineers*, vol. 145, No. 6, Dec. 1998 (pp. 360–364), Mitomi et al.

"Transmission Line Aspects of the Design of Broad–Band Electrooptic Traveling–Wave Modulators", *Journal of Lightwave Technology*, vol. 5, No. 3, Mar. 1987(pp. 316–319), Atsuki et al.

* cited by examiner

Primary Examiner—Georgia Epps
Assistant Examiner—Timothy J. Thompson
(74) Attorney, Agent, or Firm—Burr & Brown

(57) ABSTRACT

A traveling wave optical modulator comprising a substrate made of a ferrodielectric electro-optic single crystal and having a pair of opposing main planes, an optical waveguide formed on a side of one of the main planes of the substrate, and a pair of electrode films which apply a voltage for modulating a light transmitting through the optical waveguide and between which the optical waveguide is located, wherein the thickness of each of the electrode films is not less than 20 μm and a width of a gap between a pair of the electrode films is not less than 25 μm.

5 Claims, 10 Drawing Sheets

TRAVELING WAVE OPTICAL MODULATOR

BACKGROUND OF THE INVENTION (1) Field of the Invention

The present invention relates to traveling wave optical modulators.

(2) Related Art Statement

First, the speed mismatching of the traveling wave optical modulator will be explained. In the traveling wave electrode, the speed of the light traveling through the optical waveguide largely differs from that of electric signals (macrowaves) propagating in the electrode. Assume that the speeds of the light propagating in the crystal and that of the microwave are taken as Vo and Vm, respectively. For example, an $LiNbO_3$ optical modulator with a planar type electrode is as follows. The $LiNbO_3$ single crystal has a refractive index of 2.15, and the speed of the light traveling the optical waveguide is in reverse proportion to the refractive index. On the other hand, the effective refractive index of the microwave is given by a square root of a dielectric constant near a conductor. The dielectric constant of the $LiNbO_3$ single crystal is uniaxial: 28 in a Z-axis direction and 43 in a Y-axis direction. Therefore, under consideration of an effect of air having a dielectric constant of 1, the effective refractive index of the microwaves in the $LiNbO_3$ optical modulator which has no Si buffer layer and the thinner thickness T of the electrode film, is about 4, which is about 1.9 times as much as 2.15. Therefore, the speed of the light wave is about 1.9 times as much as that of the microwaves.

The light-modulating band width "fm" or the upper limit that of the modulating speed is in proportion to a reciprocal of a difference in speed between the light wave and the microwave. That is, fm 1/(Vo−Vm). In case of the $LiNbO_3$ optical modulator as mentioned above, assuming that the electrode less is 0, the band width fm x the electrode length "1" has a limit of 9.2 GHz-cm. The longer the electrode, the more conspicuous is the influence of the limit of the operation speed. Therefore, it is strongly demanded to put into existence an optical modulator having a wide band range and a highly effective characteristic.

In order to solve the above problem, the present inventors reported in JP-A 10-133,159 that a traveling wave optical modulator can be successfully operated at 10 GHz or more when a thin portion is provided at a substrate of the modulator under the optical waveguide, and the thin portion is reduced to 10 μm or less. In the following, the relationship between the thickness of the thin portion and the modulating band range is shown.

TABLE 1

| Thickness of the thin portion (μm) | 5 | 10 | 20 | 50 | 100 | 300 |
|---|---|---|---|---|---|---|
| Modulating band range (GHz-cm) | 100 | 30 | 20 | 15 | 10 | 10 |

In an actual production of such a modulator, however, it was difficult in working to thin the substrate. Particularly, if the substrate is thinner than 10 μm, the yield decreases due to cracking of the substrate. As the thickness of the substrate is reduced to thinner than 10 μm, an effect of trapping the light inside the optical waveguide in a vertical direction becomes stronger, so that the field of the optical waveguide mode is deformed flat. Therefore, the mismatching increases between the optical field of the waveguide thinned portion and the optical field of the waveguide non-thinned portion or the optical fiber, thereby increasing a coupling less. In order to solve these problems, it is necessary that a velocity matching condition is found out in a modulating range of not less than 100 GHz·cm, while maintaining the thickness of the substrate at not less than 10 μm.

SUMMARY OF THE INVENTION

It is an object of the present invention to enable a velocity matching between microwaves and optical waves in a modulating range of not less than 100 GHz·cm in a traveling wave optical modulator, while maintaining the thickness of the substrate at not less than 10 μm, while not necessitating a reduction in thickness of a substrate down to less than 10 μm.

The present invention relates to a traveling wave optical modulator comprising a substrate made of a ferrodielectric electro-optic single crystal and having a pair of opposing main planes, an optical waveguide formed on a side of one of the main planes of the substrate, and a pair of electrode films which apply a voltage for modulating a light transmitting through the optical waveguide and between which the optical waveguide is located, wherein the thickness of each of the electrode films is not less than 20 μm and a width of a gap between a pair of the electrode films is not less than 25 μm.

These and other objects, features and advantages of the invention will be appreciated when read in connection with the attached drawings, with the understanding that some modifications, variations and changes of the invention could be made by the skilled in the art to which the invention pertains.

BRIEF DESCRIPTION OF THE INVENTION

For a better understanding of the invention, reference is made to the attached drawings, wherein.

In the following, the present invention will be explained in more detail with reference to the attached drawings.

Figure 1:
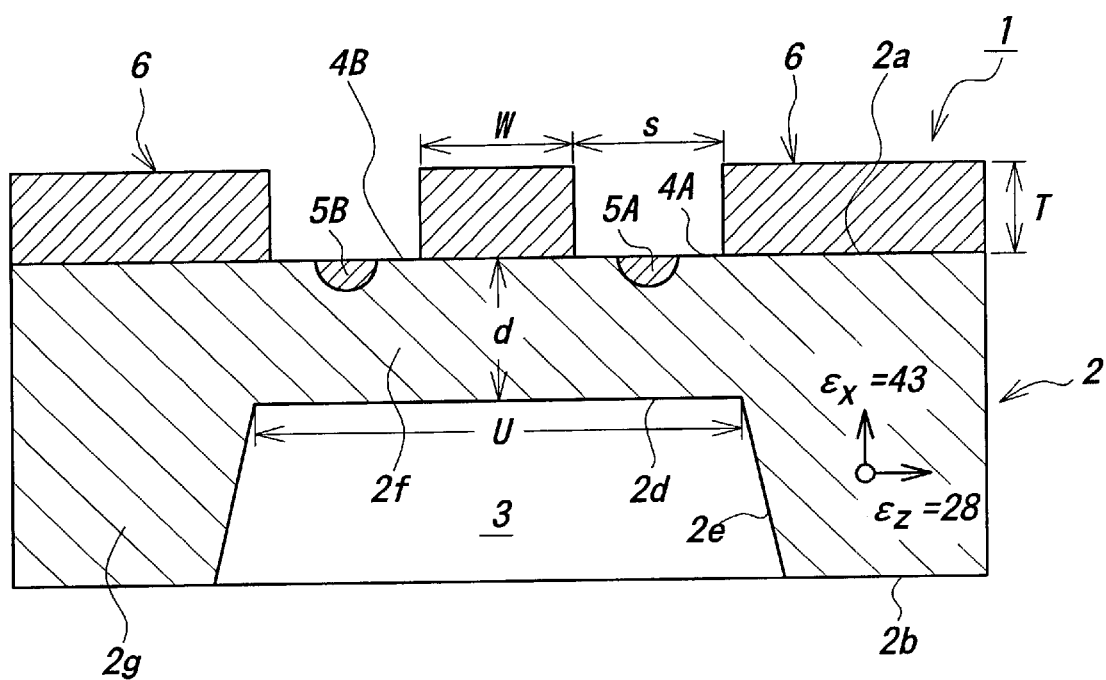
FIG. 1 is a sectional view of schematically illustrating a traveling wave optical modulator 1 according to one embodiment of the present invention.

FIG. 1 is a sectional view of a traveling wave optical modulator according to one embodiment of the present invention.

A substrate 2 is made of a ferrodielectric electro-optic single crystal. Such a crystal is not limited to any particular one, so long as it enables the optical modulation. However, one or more kinds of single crystals selected from the group consisting of a single crystal of lithium niobate, a single crystal of lithium tantalate, and a single crystal of lithium niobate-lithium tantalate solid solution is particularly preferred.

The substrate 2 has a pair of main planes 2a, 2b. A recess 3 is formed at a side of the main plane 2b, so that a thinned portion 2f is formed in the substrate at an area where the recess 3 is formed. Optical waveguides 5A and 5B are formed at a side of the main plane 2a at a location corresponding to the thinned portion 2f. Reference numeral 2g denotes a thick portion and a bottom wall face of the thinned portion, respectively, 2e denoting an inner wall face of the thick portion 2g.

An electrode film 6 is formed on one main plane 2a of the substrate 2. Since the substrate 2 is a x-cut substrate, the optical waveguides 5A and 5B are located inside gaps 4A and 4B among the electrodes 6, respectively, to utilize the largest electrooptic coefficient $r_{33}$.

In the present invention, the thickness T of the electrode film is not more than 20 $\mu$m, and the width S of the gap 4a, 4b between a pair of the electrode is 25 $\mu$m.

In the use of the substrate having a configuration shown in FIG. 1, a part of an electric field is exposed in the recessed portion 3 (air layer), thereby reducing the effective refractive index nmw. That portion of each electrode film 6 which functions to produce the electric film 6 exists on the thinner portion, that is, above the recessed portion 3. Therefore, if the electrode film 6 is thickened, the center of the electric field goes up, so that the electric field is unlikely to ooze out into the air layer 3. Therefore, it is feared that the effective reflective index nmw of the microwave does not almost change, and instead, the drive voltage V$\pi$ increases. However, when a traveling wave optical modulator having the configuration shown in FIG. 1 was actually produced, it was discovered contrary to expectation that increase in the thickness of the electrode film 6 decrease the nmw. In addition, it was confirmed that the drive voltage is not dependent upon the thickness T of the electrode film 6.

Further, examination of the relationship between the effective refractive index of the microwaves and the width S of the gap through changing the width of the gap 4A, 4B between the electrode films 6 in various ways revealed that particularly the nmw value is reduced when the S value is set at not less than 25 $\mu$m.

Therefore, it is discovered that if the thickness T of the electrode films is not less than 20 $\mu$m and the width of the gap 4A, 4B between the electrode films 6 is not less than 25 $\mu$m, the effective refractive index nmw is conspicuously decreased. As a result, it is revealed that even if the thickness d of the substrate 2 is set, for example, at 10 $\mu$m in an area where the optical waveguide is formed, a completely phase-matching condition which the speed of the microwave equal to the one of the light waves can be satisfied and the characteristic impedance can also be adjusted to 50 Ω.

Further, if the thickness T of the electrode film is 20 $\mu$m or more, the surface area of the electrode film increases, which enables reduction in the conductor less α. Therefore, the modulating band width determined by the effective refractive index, the characteristic impedance and the electrode less can be further enlarged.

On the other hand, according to the present invention, since the width of the gap 4A and 4D between the electrode films is increased, it is feared that the drive voltage Vec increases. However, in the modulator using the substrate with both the thin portion 2f and the thick portion 2g, no buffer layer is required, so that the drive voltage can be reduced as compared with a conventional modulator using a buffer layer. For example, if the width of the gap 4A, 4B is set at 35 $\mu$m, V$\pi$·L can be 9.5V·cm.

In the present invention, the thickness d of the substrate in an optical waveguide-forming area is preferably 10 $\mu$m. If so, coupling less between other optical waveguide or optical fiber can be reduced because the optical field of the waveguide with 10 $\mu$m thin portion does not deform much. On the other hand, in order to reduce the effective refractive index nmw of the microwaves, "d" is preferably not more than 20 $\mu$m.

Further, if "d" is particularly not more than 20 $\mu$m, it is clarified that when the width S of the gap 4A, 4B between the electrode films is not less than 25 $\mu$m, the effective refractive index nmw of the microwaves tends to further decrease.

EXAMPLES

In the following, more concrete examples will be explained.

(Experiment 1)

Relationship among the thickness of the electrode films, the effective refractive index nmw, the characteristic impedance and V$\pi$·L was measured.

Mach-Zender optical waveguides 5A and 5B having a configuration shown in FIG. 1 were formed on the other main plane 2a of the wafer according to a titanium-diffusing process or a photolithographic method. Then, electrode films were formed of Au. Then, more specifically, one main plane (a rear face) of a X-cut three-inch wafer (LiNbO$_3$) was ground to make the wafer 300 $\mu$m.

A resist film was coated on this main plane, and the wafer was placed in an excimer laser working machine where the wafer was positionally aligned with a working location with reference to a crystal orientation flatness of the substrate. A KrF eximer laser was used as a light source, the one main surface 2b was worked through exposure according to a spot scanning system. The optical system was adjusted so that the size of the spot irradiated might be 1.0 mm in a scanning direction and 0.2 mm in width with an irradiating energy density of 6.0 J/cm$^2$. The rear side of the electrode film was worked under a condition: a pulse width of 15 nsec., a pulse frequency of 600 Hz and a scanning speed of 0.1 mm/sec., thereby forming a recess 3s. The thus produced wafer was cut into traveling wave optical modulators by using a dicing saw machine, and end faces of the optical waveguides were optically polished.

The thickness of the substrate 2 was 300 $\mu$m, the width of the recess 3 was 150 $\mu$m, and the thickness "d" of the thin portion 2f was 10 $\mu$m. Further, the widths S of the gaps 4A and 4B between the electrode films were 14 $\mu$m and 56 $\mu$m, respectively, and W was 10 $\mu$m. Furthermore, Fx and Fz were 43 and 28, respectively.

A single-core fiber array holding a 1.55 $\mu$m single mode optical fiber was prepared, the optical modulator was coupled to the array, and they were bonded to each other, while the optical fiber was aligned with the optical waveguide. Thereafter, the effective refractive index nmw of the microwave and the characteristic impedance were measured through TDR measurement. The thickness T of the electrode film was variously varied in a range of 5 to 35 μm.

Figure 2:
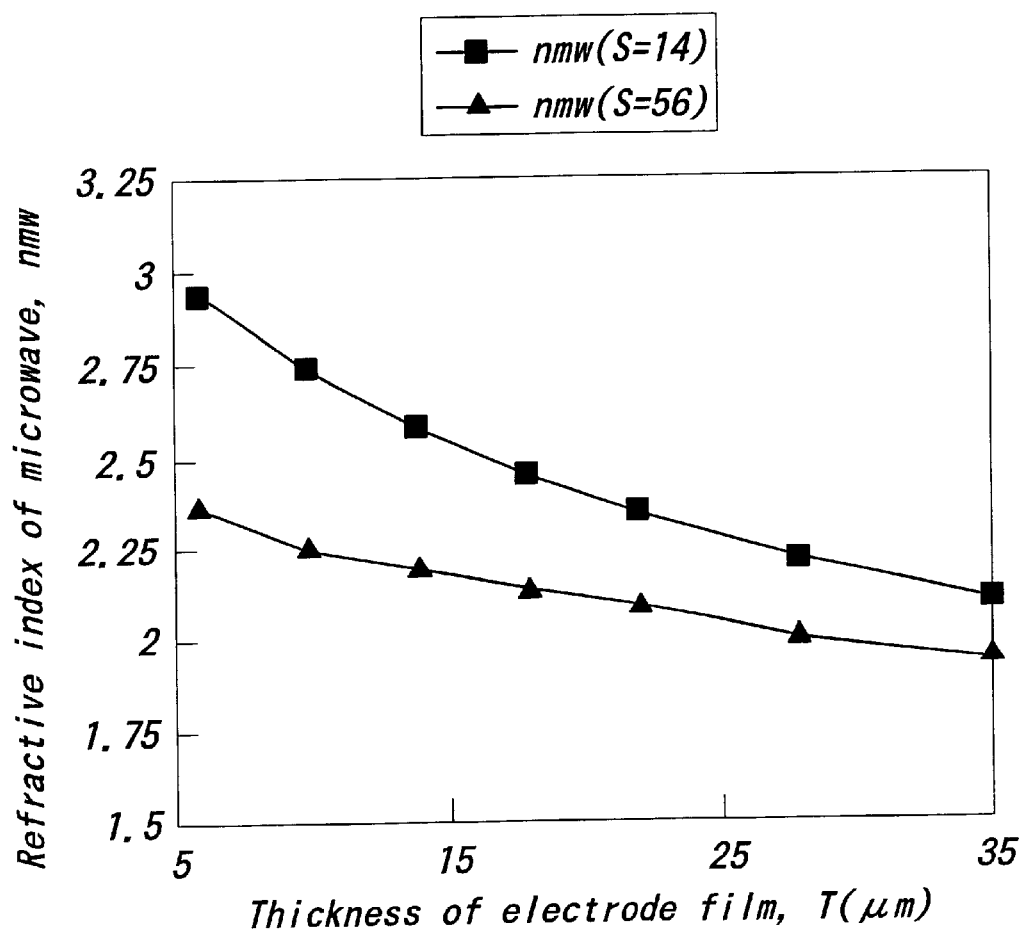
FIG. 2 is a graph shown the relationship between the thickness T of the electrode film and the effective refractive index nmw.
Figure 3:
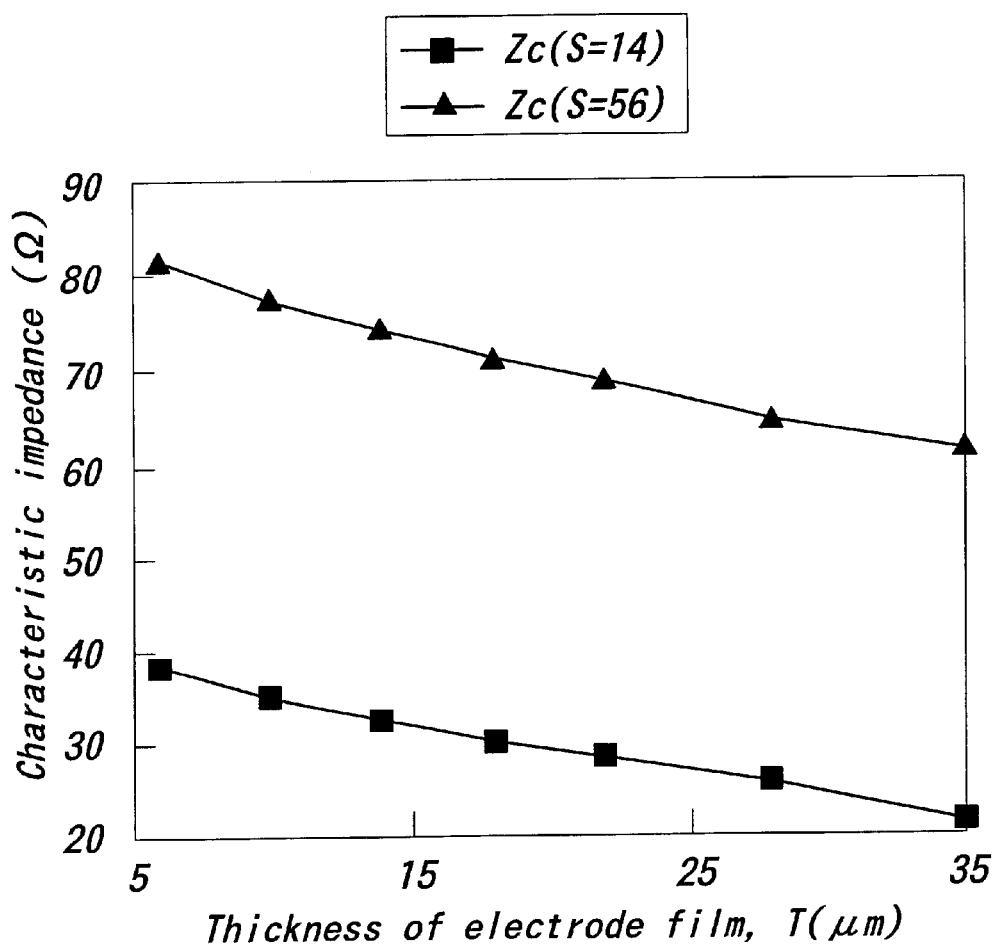
FIG. 3 is a graph showing the relationship between the thickness T of the electrode film and the characteristic impedance.
Figure 4:
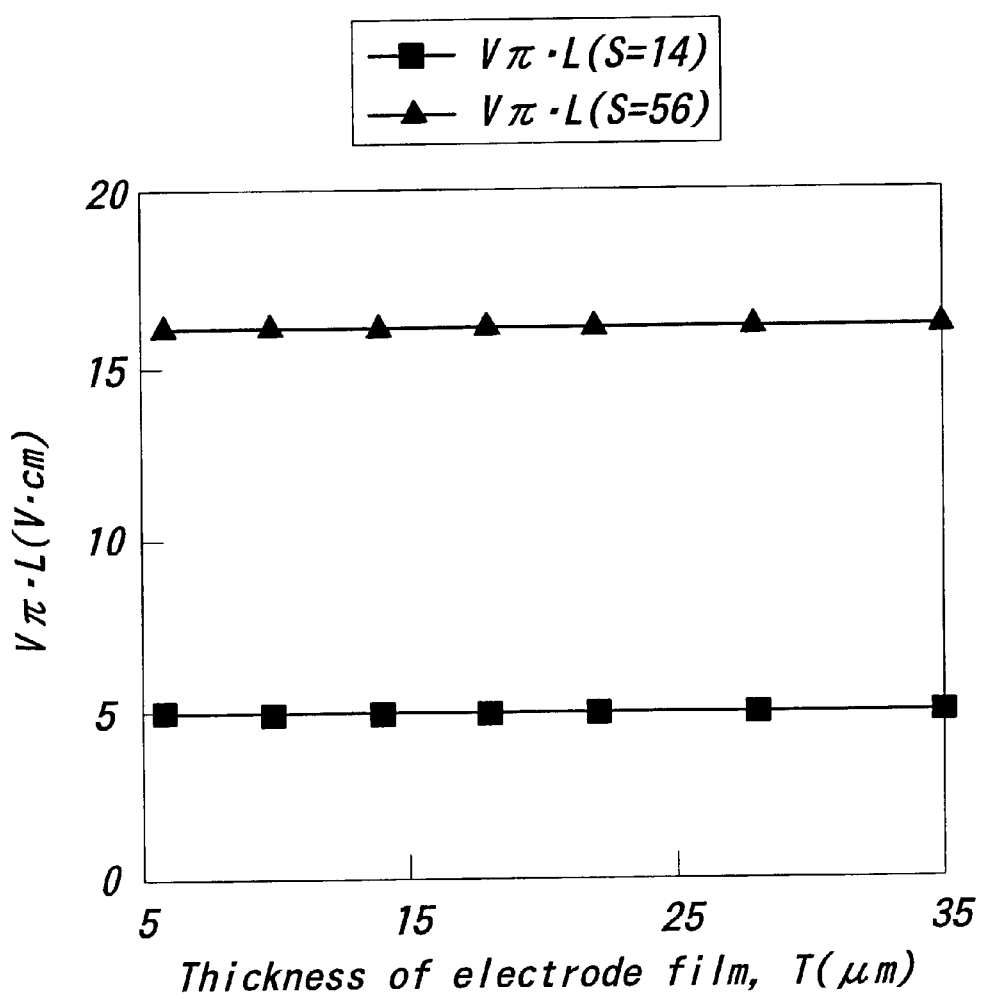
FIG. 4 is a graph showing the relationship between the thickness T of the electrode film and Vπ·L.

FIG. 2 is a graph showing a relationship between the thickness T of the electrode film and the effective refractive index nmw of the microwave. Contrary to expectation, it was discovered that as T increases, the nmw value decreases. FIG. 3 is a graph showing the relationship between T and the characteristic impedance. As T increased, the characteristic impedance decreased. FIG. 4 is a graph showing the relationship between T and Vπ·L. It was discovered that the drive voltage is not influenced by the thickness T of the electrode film.

(Experiment 2)

The widths S of the gaps 4A and 4B between the electrodes, the effective refractive index nmw of the microwave and the characteristic impedance was measured in the same manner as in Experiment 1. The width W of the central electrode was 10 μm, the thickness T of the electrode film was 16 μm or 28 μm, and the thickness "d" of the thin portion 2f was 10 μm, 15 μm, 20 μm or 30 μm. Measured results are shown in FIGS. 5 and 6.

Figure 5:
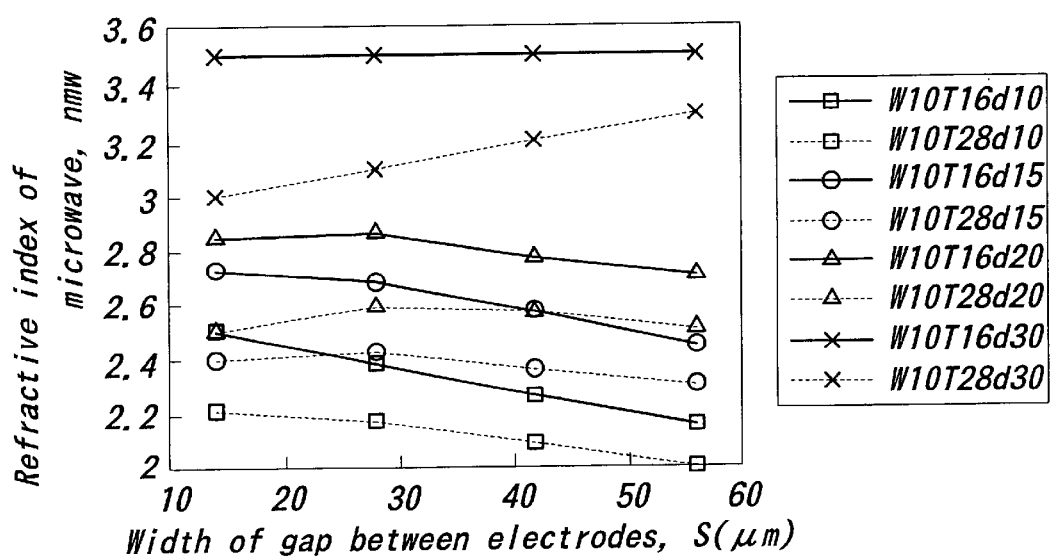
FIG. 5 is a graph showing the relationship between the width S of the gap between the electrodes and the effective refractive index nmw of the microwave.

As is seen from FIG. 5, in case of the thickness "d" of the thin portion being 30 μm, as the width S of the gap increases, the effective refractive index nmw of the microwave tends to increase. Particularly, this tendency increases with increase in the thickness T of the electrode film. On the other hand, it was clarified that in the case of the thickness "d" of the thin portion being not more than 25 μm, particularly not more than 20 μm, as the width S of the gap increases, the effective refractive index nmw of the microwave conspicuously decreases.

Figure 6:
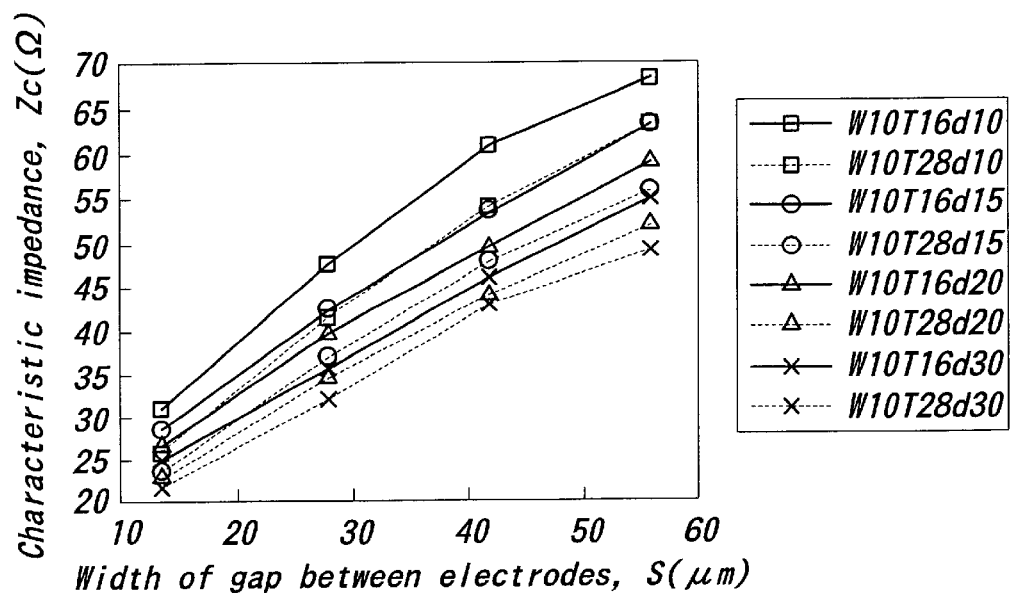
FIG. 6 is a graph showing the relationship between the width S of the gap between the electrodes and the characteristic impedance.

As is seen from FIG. 6, as the width S of the gap increases, the characteristic impedance also increases.

(Experiment 3)

The relationship between the width S of the gap 4A, 4B among the electrodes and Vπ·L was measured in the same manner as in Experiment 1. The width W of the central electrode, the thickness T of the electrode film and the thickness "d" of the thin portion 2f were 10 μm, 30 μm, and 10 μm, respectively. Measurement results are shown in FIG. 7.

Figure 7:
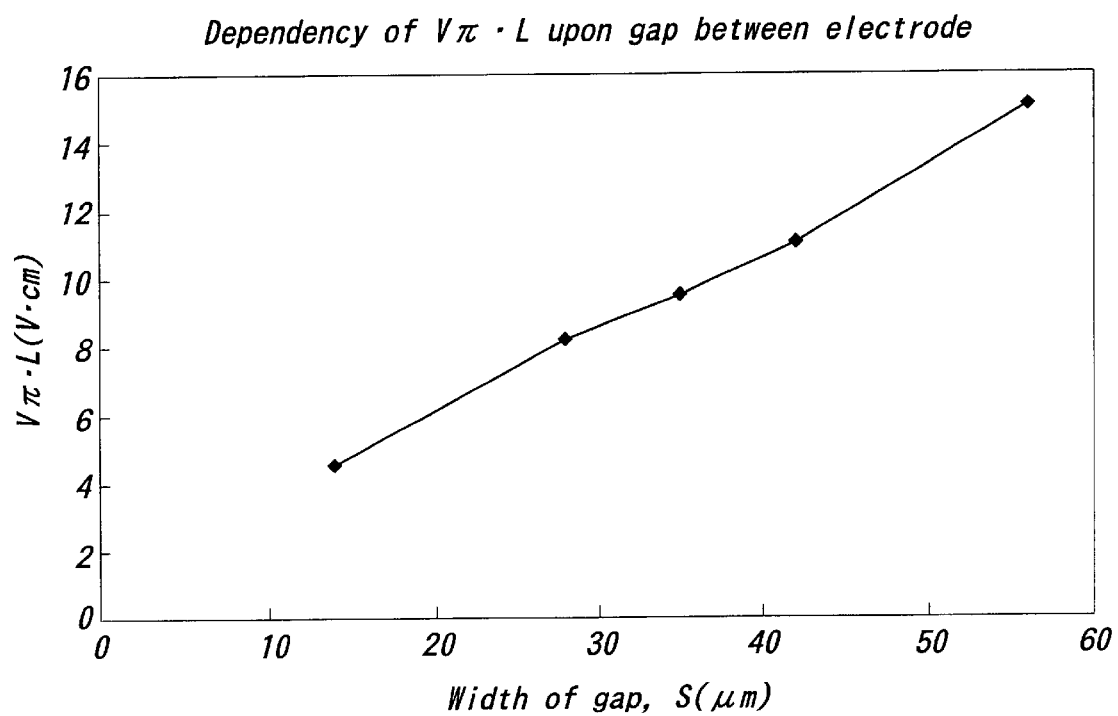
FIG. 7 is a graph showing the relationship between the width S of the gap between the electrodes and Vπ·L.

As is seen from FIG. 7, as the width S of the gap increases, Vπ·L increases.

(Experiment 4)

Figure 8:
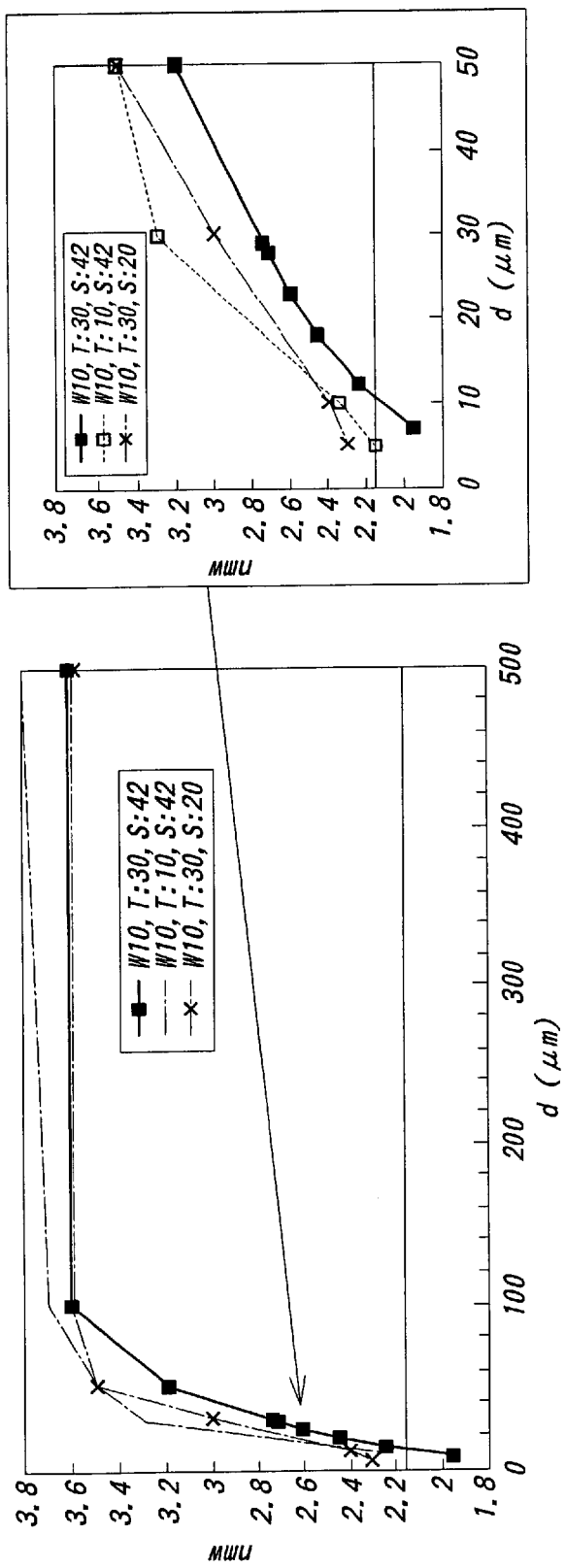
FIG. 8 is a graph showing the relationship between the thickness "d" of the substrate and the effective refractive index nmw of the microwave.

The relationship between the thickness "d" of the substrate and the effective refractive index nmw of the microwave was measured in the same manner as in Experiment 1. The $S_{21}$ characteristic was measured by a network analyzer, and a conductor less α was calculated. The thickness "d" was varied variously within a range of 5 to 500 μm. With respect to the thickness T of the electrode film, the width S of the gap and the width W of the central electrode, three sets of (30 μm, 42 μm, 10 μm), (10 μm, 42 μm, 10 μm), and (30 μm, 20 μm, 10 μm) were selected. FIG. 8 shows the relationship between "d" and "nmw", and Table 2 gives the relationship between "d" and the electrode less α.

TABLE 2

| Thickness T of the electrode film (μm) | Width S of the gap (μm) | Width W of the central electrode (μm) | Conductor loss α (dB/GHz$^{1/2}$ · cm) |
|---|---|---|---|
| 30 | 42 | 10 | 0.25 |
| 10 | 42 | 10 | 0.5 |
| 30 | 20 | 10 | 0.25 |

It is seen from FIG. 8, if "d" is not more than 30 μm, further not more than 25 μm, nmw conspicuously decreases. In the case of "d" being not less than 10 μm, the velocity matching condition (nmw=2.15) could be satisfied when the thickness T of the electrode film was 20 μm and the width S of the gap not less than 25μm.

(Experiment 5)

Figure 9:
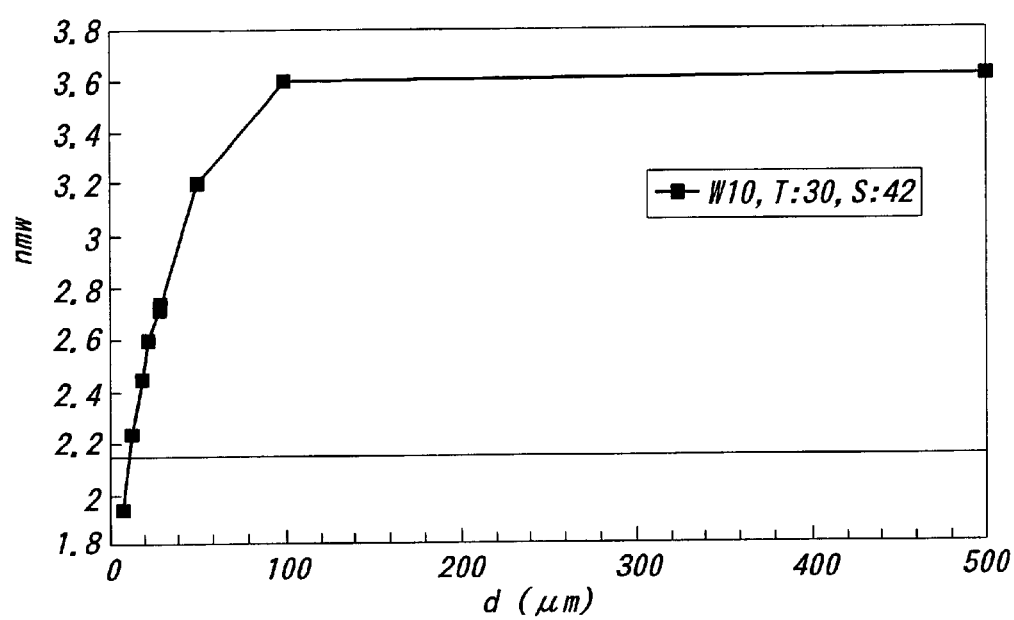
FIG. 9 is a graph showing the relationship between the thickness "d" of the substrate and the effective refractive index nmw of the microwave.
Figure 10:
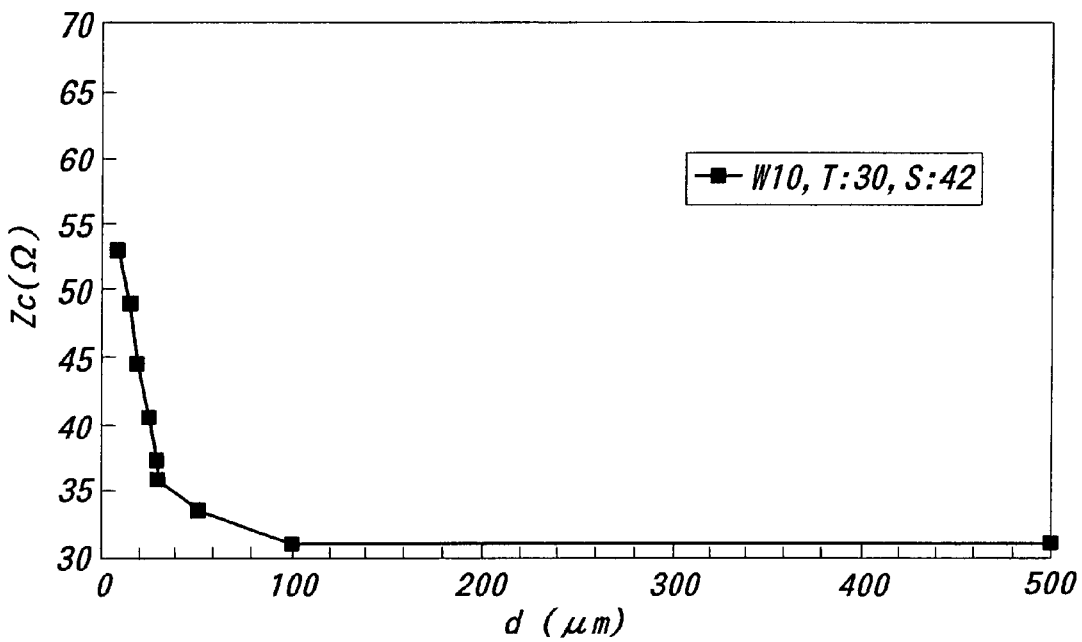
FIG. 10 is a graph showing the relationship between the thickness "d" of the substrate and the characteristic impedance Zc.
Figure 11:
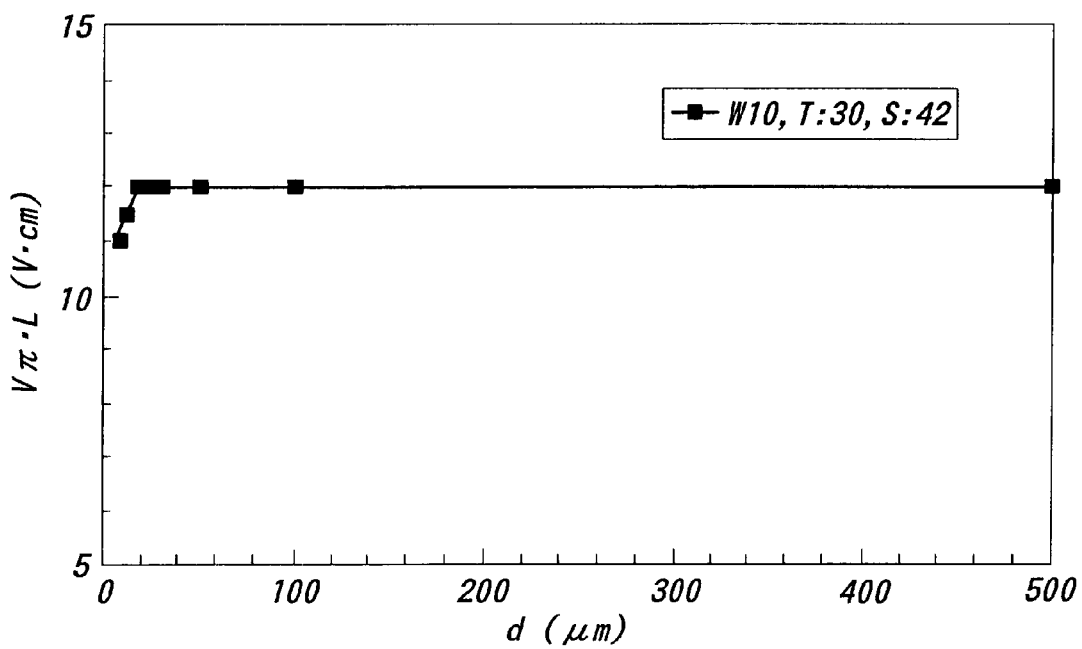
FIG. 11 is a graph showing the relationship between the thickness "d" of the substrate and Vπ·L.

The relationship between the thickness "d" of the substrate, the effective refractive index nmw of the microwave and the characteristic impedance Zc was measured in the same manner as in Experiment 1. Results are shown in FIGS. 9, 10 and 11. The thickness "d" was varied variously within a range of 5 to 500 μm. The thickness T of the electrode film, the width S of the gap and the width W of the central electrode were 30 μm, 42 μm and 10 μm, respectively. As is seen from those results, for example, when d=10 μm, a velocity matching condition (nmw=2.15) could be satisfied (FIG. 9), and the characteristic impedance and the Vπ·L could be matched to 50 Ω and 11V-cm, respectively.

According to the present invention, the traveling wave optical modulator can effect the velocity matching between the microwaves and the optical waves in a modulating band zone of not less than 10 GHz-cm or more, without reducing the thickness of the substrate down to less than 10 μm.

What is claimed is:

1. A traveling wave optical modulator comprising a substrate made of a ferrodielectric electro-optic single crystal and having a pair of opposing main planes, at least one optical waveguide formed on a side of one of the main planes of the substrate, and a pair of electrode films which apply a voltage for modulating a light transmitting through the optical waveguide and between which the optical waveguide is located, wherein the thickness of each of the electrode films is not less than 20 μm and a width of a gap between a pair of the electrode films is not less than 25 μm.

2. The traveling wave optical modulator set forth in claim 1, wherein the substrate has a thickness of not less than 10 μm and not more than 50 μm at an area where the optical waveguide is located.

3. The traveling wave optical modulator set forth in claim 2, wherein the substrate comprises a thicker portion and a thinner portion, and the optical waveguide is formed on the thinner portion.

4. The traveling wave optical modulator set forth in claim 3, wherein the thinner portion is a recessed portion formed from a side of the other main plane of the substrate.

5. The traveling wave optical modulator set forth in claim 1, wherein the each of the substrate and the optical waveguide is made of at least one kind of single crystals of a lithium niobate, lithium tantalate and a lithium niobate-lithium tantalate solid solution.

* * * * *